June 10, 1930.  S. O. KASCAK  1,762,783
ANIMAL TRAP
Filed April 18, 1929
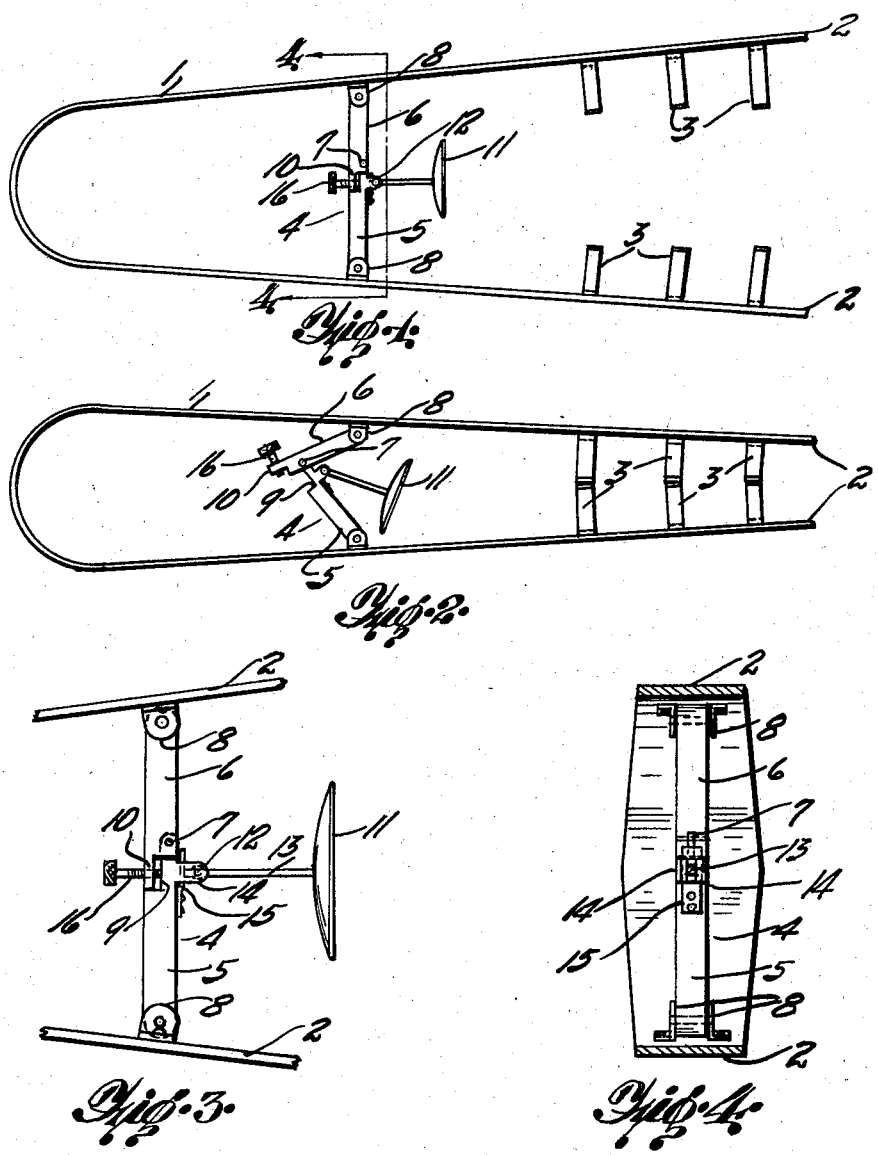
Inventor
Stephen Oscar Kascak
By Adam E. Fisher.
Attorney Patented June 10, 1930

1,762,783

UNITED STATES PATENT OFFICE

STEPHEN OSCAR KASCAK, OF HUGOTON, KANSAS

ANIMAL TRAP

Application filed April 18, 1929. Serial No. 355,999.

This invention relates to animal traps.

The main object of the invention is to provide a trap which may be readily placed in the burrows of the various burrowing animals such as pocket gophers and other ground squirrels in such manner that the animal will be trapped as it attempts to leave its burrow.

Another object is the provision of a trap of this character which will be simple and durable in structure and efficient in operation.

The foregoing and other objects together with means whereby the same may be carried into effect will best be understood from the following description of a preferred embodiment of the invention taken in connection with the accompanying drawing wherein:

Figure 1 is a side view of the trap in its set position.

Figure 2 is a view similar to Figure 1 with the trap in its sprung position.

Figure 3 is an enlarged detail side view of the trigger mechanism and associated elements.

Figure 4 is an enlarged section along the line 4—4 in Figure 1.

Referring now more particularly to the drawing, the reference numeral 1 denotes a substantially U-shaped spring, the legs 2 of which are normally adapted to close toward each other as shown in Figure 2 in such manner that an animal will be caught between the arcuate jaws 3 carried by the said legs 2 and killed by means of the pressure exerted by the spring. A trigger mechanism denoted generally at 4 normally holds the spring in its open position and this mechanism comprises the trigger members 5 and 6 pivotally connected at 7 at their inner ends and pivoted at their outer ends in brackets 8 secured to the inner sides of the legs 2. The member 5 has a recess 9 into which is adapted to fit the finger 10 on the member 6 so that the spring legs 2 will be held apart when the trigger members 5 and 6 are aligned as shown in Figure 1. A trip plate 11 is pivotally attached at 12 by the stem or rod 13 between ears 14 extended from the trigger member 5 and this trip plate is normally held extending outwardly at an angle of 90 degrees from the trigger member 5 by means of a leaf spring 15 secured to the member 5 and which bears against the inner end of the rod 13 as shown in Figure 3. An adjusting screw 16 is threaded through the finger 10 on the trigger member 6 and engages the member 5 so that by adjusting this screw the trigger mechanism may be set to trip under either a light or heavy pressure as will be understood.

In use the jaws are held apart and the trigger mechanism adjusted as shown in Figure 1. The trap may then be placed in the burrow of the animal it is desired to trap and if the nature of the set permits it a stick may be placed through the bight of the spring 1 so that the trap cannot be drawn into the burrow by the animal. It will be readily understood that as the animal attempts to leave its burrow it will strike the trip plate 11 and swing the trigger members 5 and 6 inwardly so that the spring legs 2 will close thus gripping the animal between the jaws 3 as hereinbefore pointed out.

While I have herein set forth a certain preferred embodiment of my invention it is understood that I may vary from the same in minor structural details not departing from the spirit of the invention and within the scope of the appended claim.

I claim:

In a device of the kind described, a U-shaped spring with normally convergent legs, jaws carried by the said legs, a trigger mechanism comprising a pair of pivotally connected trigger members pivotally mounted between the spring legs, one of the said members having a recess, an extended finger upon the other member to engage this recess, a screw threaded through the said finger and engaging the member having the said recess to adjust the action of the trigger mechanism, a stem pivotally connected to one of the said trigger members, a trip plate upon the outer end thereof and a spring upon the said trigger member engaging the inner end of the stem to hold the same in an adjusted position.

In testimony whereof I affix my signature.

STEPHEN OSCAR KASCAK.